United States Patent
Shih

(10) Patent No.: US 11,070,403 B1
(45) Date of Patent: Jul. 20, 2021

(54) COMPUTER PROGRAM PRODUCT AND METHOD AND APPARATUS FOR ADJUSTING EQUALIZATION

(71) Applicant: Silicon Motion, Inc., Zhubei (TW)

(72) Inventor: Fu-Jen Shih, New Taipei (TW)

(73) Assignee: SILICON MOTION, INC., Zhubei (TW)

( * ) Notice: Subject to any disclaimer, the term of this patent is extended or adjusted under 35 U.S.C. 154(b) by 0 days.

(21) Appl. No.: 16/944,986

(22) Filed: Jul. 31, 2020

(30) Foreign Application Priority Data

Apr. 14, 2020 (CN) .......................... 202010288539.7

(51) Int. Cl.
*H04L 25/03* (2006.01)
*H04L 1/00* (2006.01)

(52) U.S. Cl.
CPC ...... *H04L 25/03057* (2013.01); *H04L 1/0047* (2013.01)

(58) Field of Classification Search
CPC ............ H04L 1/0047; H04L 25/03006; H04L 25/03019; H04L 25/03038; H04L 25/0305; H04L 25/03057; H04L 25/03071
See application file for complete search history.

(56) References Cited

U.S. PATENT DOCUMENTS

| | | | | |
|---|---|---|---|---|
| 5,991,339 A * | 11/1999 | Bazes | ................ | H03H 11/1291 333/18 |
| 8,050,317 B2 | 11/2011 | Okamura et al. | | |
| 8,081,723 B1 * | 12/2011 | Ding | ....................... | H04L 7/048 375/355 |
| 8,744,012 B1 * | 6/2014 | Ding | ................ | G01R 31/31711 375/316 |
| 2001/0001616 A1 * | 5/2001 | Rakib | ...................... | H04N 7/10 375/259 |
| 2003/0147168 A1 * | 8/2003 | Galbraith | ......... | G11B 20/10055 360/53 |
| 2008/0175310 A1 * | 7/2008 | Okamura | .......... | H04L 25/03019 375/232 |
| 2012/0044983 A1 * | 2/2012 | Kerr | .................. | H04L 25/03057 375/233 |

FOREIGN PATENT DOCUMENTS

CN 101119185 B 11/2010

OTHER PUBLICATIONS

English translation of the Taiwanese Search Report, dated Jul. 29, 2020, for Taiwanese Application No. 109112449.

* cited by examiner

*Primary Examiner* — David B Lugo
(74) *Attorney, Agent, or Firm* — Birch, Stewart, Kolasch & Birch, LLP

(57) ABSTRACT

The invention introduces a non-transitory computer program product for adjusting equalization when executed by a processing unit of a storage device. The non-transitory computer program product includes program code to: repeatedly adjust a parameter of an equalizer after a symbol decoding error is detected until an adjustment failure is detected or successive waveforms output from the equalizer belong to an eye open state.

18 Claims, 7 Drawing Sheets

COMPUTER PROGRAM PRODUCT AND METHOD AND APPARATUS FOR ADJUSTING EQUALIZATION

CROSS-REFERENCE TO RELATED APPLICATIONS

This application claims the benefit of priority to Patent Application No. 202010288539.7, filed in China on Apr. 14, 2020; the entirety of which is incorporated herein by reference for all purposes.

BACKGROUND

The disclosure generally relates to storage devices and, more particularly, to a computer program product, a method and an apparatus for adjusting equalization.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

During high-speed transmission between a host side and a device side, for example, at a transmission rate higher than 6 Gb/sec, data may be vulnerable by jitters, voltage fluctuations on the motherboard, and Inter-Symbol Interference (ISI). Thus, physical layers of the host side and the device side may be equipped with equalizers to eliminate or suppress data errors by adjusting parameters of the equalizers during high-speed transmission. The equalization adjustment can only be initiated by the host side according to standard specifications, such as Universal Flash Storage (UFS). The host side may trigger the equalization adjustment before the transmission mode is changed to a high-speed gear (such as High Speed Gear 4, HS-G4, or higher) or the error rate of received data from the device side has exceeded a threshold. However, in some circumstances, the device side discovers that the error rate of received data from the host side has reached or exceeded a threshold earlier than that is discovered by the host side in the opposite way. Relying on the host to trigger the equalization adjustment only would delay the timing of correcting transmission errors. Thus, it is desirable to have a computer program product, a method and an apparatus for adjusting equalization trigged by a device side.

SUMMARY

In an aspect of the invention, a non-transitory computer program product is introduced for adjusting equalization when executed by a processing unit of a storage device. The non-transitory computer program product includes program code to: repeatedly adjust a parameter of an equalizer after a symbol decoding error is detected until an adjustment failure is detected or successive waveforms output from the equalizer belong to an eye open state.

In another aspect of the invention, a method is introduced for adjusting equalization, performed by a processing unit of a storage device when loading and executing program code, to include: repeatedly adjusting a parameter of an equalizer after a symbol decoding error is detected until an adjustment failure is detected or successive waveforms output from the equalizer belong to an eye open state.

In still another aspect of the invention, an apparatus is introduced for adjusting equalization to include: an equalizer; a symbol decoder; and a processing unit. The processing unit is arranged operably to repeatedly adjust a parameter of the equalizer after a symbol decoding error is detected until an adjustment failure is detected or successive waveforms output from the equalizer belong to an eye open state.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
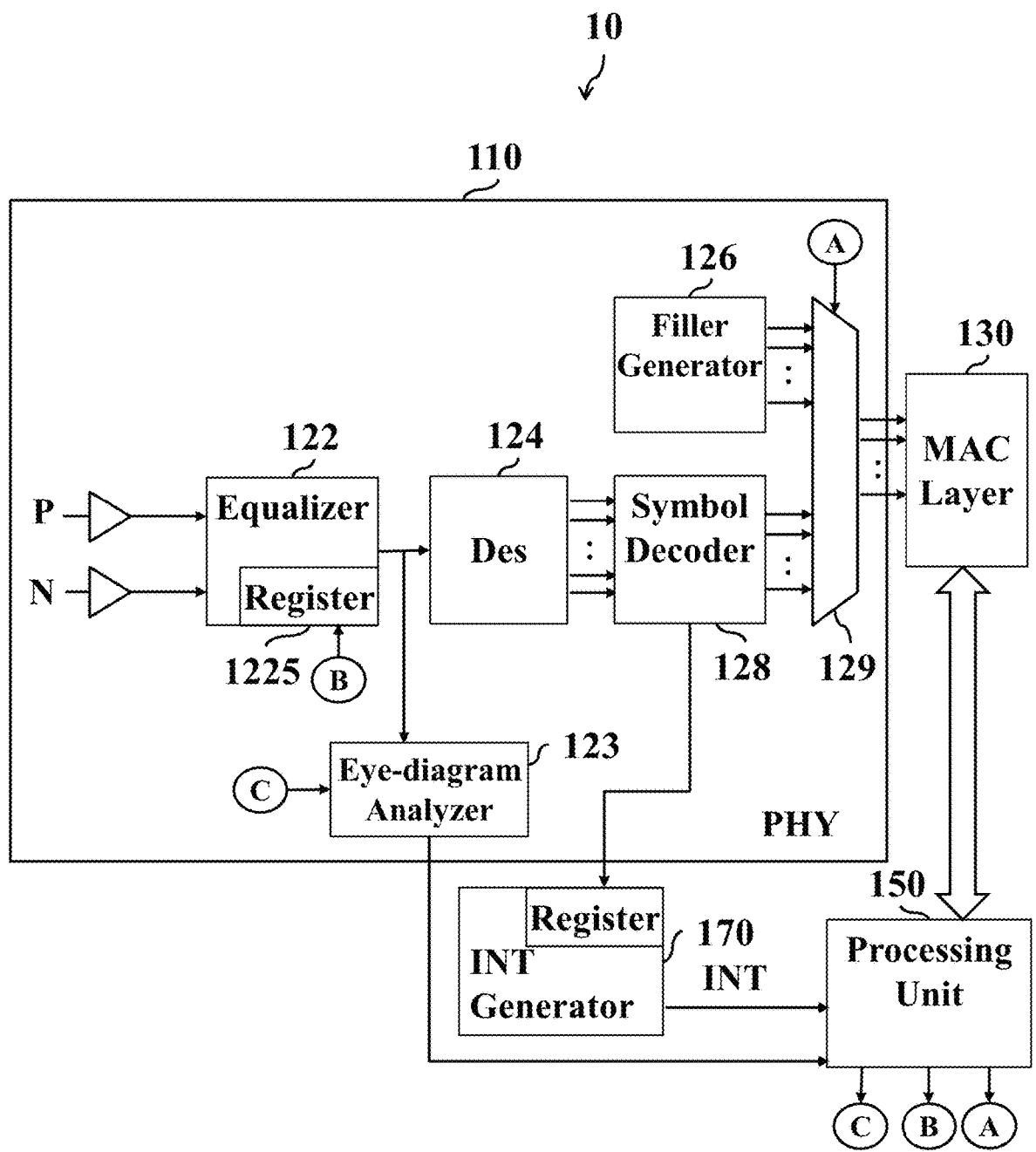
FIG. 1 is a block diagram of a storage device according to an embodiment of the invention.

Refer to FIG. 1. A storage device 10 may be installed in an electronic apparatus, such as a Personal Computer (PC), a laptop PC, a tablet PC, a mobile phone, a digital camera, a digital recorder, a portable drive, a memory card, a Solid State Disk (SSD) drive, or other consumer electronic products. The storage device 10 includes a physical layer (hereinafter referred to as PHY) 110, a media access control layer (hereinafter referred to as MAC layer) 130, a processing unit 150 and an interrupt generator 170. The processing unit 150 may be implemented in numerous ways, such as with general-purpose hardware (e.g., a single processor, a multiprocessor capable of parallel computations, a graphical processing unit, or others capable of the computation) that is programmed using software and/or firmware instructions to perform the functions recited herein. The processing unit 150 may receive host commands from the host side, such as host read, write, and erase commands defined in the UFS specifications, through the PHY 110 and the MAC layer 130.

The storage device 10 includes a storage unit (not shown in FIG. 1) for providing huge storage space typically in hundred Gigabytes, or even several Terabytes, for storing a wide range of user data, such as high-resolution images, video files, etc. The storage unit 153 includes control circuits and memory arrays containing memory cells, such as Single Level Cells (SLCs), Multi-Level Cells (MLCs), Triple Level Cells (TLCs), Quad-Level Cells (QLCs), or any combinations thereof.

The PHY 110 is established in the 8b/10b, 64b/66b or 128b/130b Serializer/Deserializer (hereinafter referred to as SerDes) environment, which includes a pair of functional circuits to compensate for limited input/output. It provides data transmission over a differential pair in order to minimize the number of I/O pins and interconnects. Specifically, a transmitter of a host converts low-speed parallel signals into high-speed serial signals and transmits the converted ones to a receiver of the storage device 10 through the differential pair. The PHY 110 includes a deserializer 124, which converts high-speed serial signals received through an equalizer 122 into low-speed parallel signals. Signals received from the transmitter of the host and flew to the receiver of the storage device 10 may also be referred to as host data.

Figure 2:
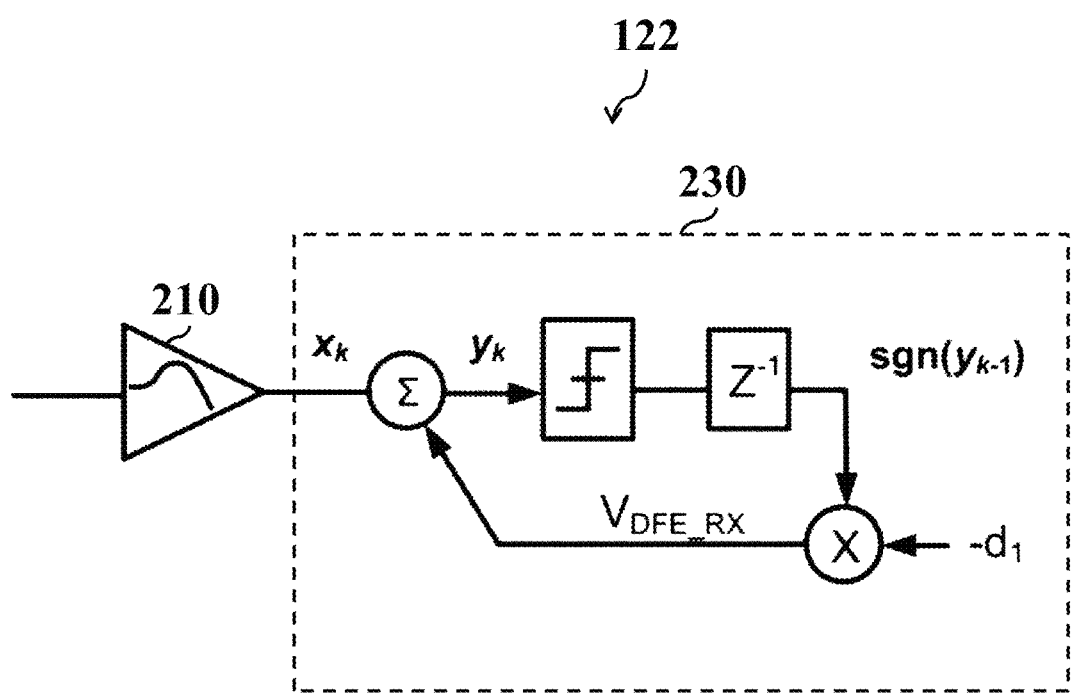
FIG. 2 is a schematic diagram illustrating an equalizer according to an embodiment of the invention.

To address technical problems that data is vulnerable by jitters, voltage fluctuations on the motherboard, and Inter-Symbol Interference (ISI) during high-speed transmission between a host side and a device side, the PHY 110 is equipped with the equalizer 122 between transmission channels and the deserializer 124. The equalizer 122 includes a register 1225 and the processing unit 150 adjusts the parameters of the equalizer 122 in operation by setting the value of the register 1225. Refer to FIG. 2. For example, the equalizer 122 includes a first-order Continuous Time Linear Equalizer (CTLE) 210 and a 1-tap Decision Feedback Equalizer (DFE) 230. Although embodiments of the invention describe the equalizer architecture as shown in FIG. 2, those artisans may realize the equalizer 122 in other well-known architecture, and the invention should not be limited thereto. For example, the equalizer 122 is modified to include the first-order CTLE 210 only, the first-order CTLE 210 is changed to another equivalent CTLE, the 1-tap DFE 230 is changed to multi-tap DFE or another equivalent DFE, or others.

The characteristics of the CTLE may be expressed using the following conversion function:

$$H(s) = \frac{A_{DC}\omega_{P1}\omega_{P2}}{\omega_Z} \frac{s+\omega_Z}{(s+\omega_{P1})(s+\omega_{P2})}$$

where $A_{DC}$ is the DC gain, $\omega$ equals $2\pi f$, $f_z$ is the zero, $f_{P1}$ is the first Pole, and $f_{P2}$ is the second Pole.

The characteristics of the DFE may be expressed using the following formulae:

$$y_k = x_k - V_{DFE\_RX}$$

$$y_k = x_k - d_1 \, \mathrm{sgn}(y_{k-1})$$

where $y_k$ is the output voltage signal of the DFE, $x_k$ is the input voltage signal to the DFE, $V_{DFE\_RX}$ is the DFE feedback voltage signal, k is the sample index of a data bit and $d_1$ is the DFE feedback coefficient.

Figure 3:
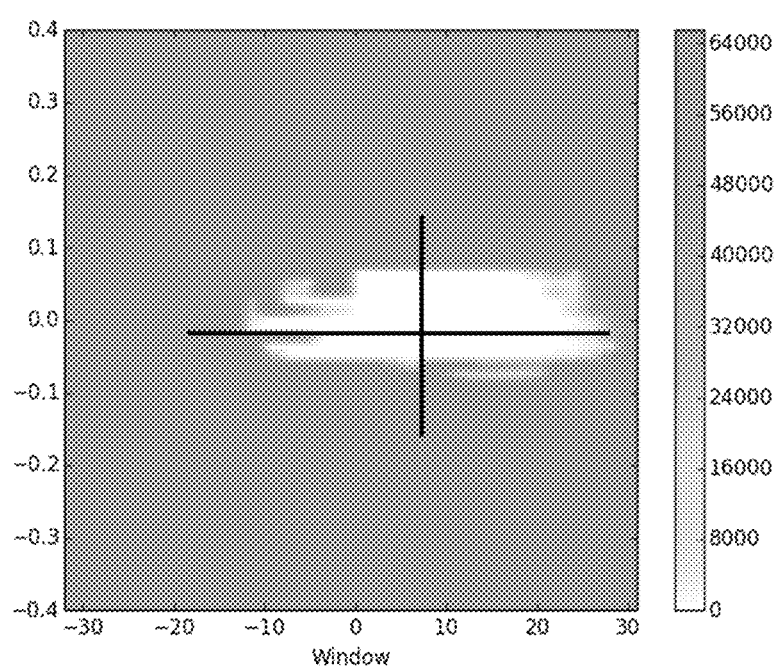
FIG. 3 is an eye-diagram showing an eye open state according to an embodiment of the invention.
Figure 4:
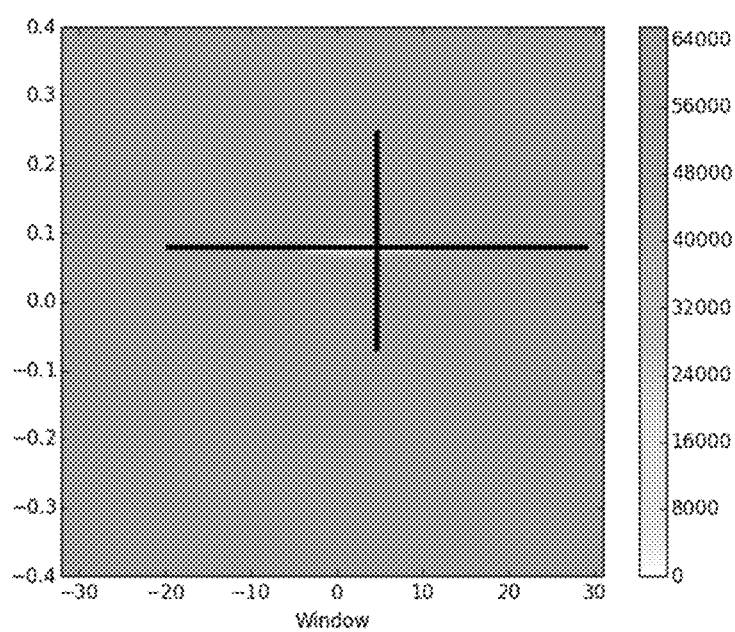
FIG. 4 is an eye-diagram showing an eye close state according to an embodiment of the invention.

The PHY 110 includes an eye-diagram analyzer 123 and the processing unit 150 may issue a signal to the eye-diagram analyzer 123 to activate the eye-diagram analyzer 123. Typically, the eye-diagram analyzer 123 is used in the factory for engineers to calibrate the equalizer 122, rather than in the actual operation of the storage device 10 after it leaves the factory. The eye-diagram analyzer 123 calculates magnitudes representing an eye diagram that is created by superimposing successive waveforms output from the equalizer 122 to form a composite image, and determine whether the calculated magnitudes belong to an eye open state (for example, as shown in FIG. 3) or an eye close state (for example, as shown in FIG. 4). The output signals from the equalizer 122 are acceptable when the calculated magnitudes belong to the eye open state. The calculated magnitudes belonging to the eye close state indicate that the equalizer 122 currently cannot eliminate interferences and requires further adjustment. To save battery power consumption, in normal situations, the eye-diagram analyzer 123 is turned off. The processing unit 150 may issue a control signal to the eye-diagram analyzer 123 to activate the eye-diagram analyzer 123 depending on certain circumstances. The eye-diagram analyzer 123 transmits the calculated magnitudes to the processing unit 150 when detecting that the successive waveforms output from the equalizer 122 belong to the eye close state, so that the processing unit 150 can adjust the equalizer 122 accordingly. The eye-diagram analyzer 123 transmits a message to the processing unit 150 to inform the processing unit 150 that the signals currently output from the equalizer 122 are acceptable when detecting that the successive waveforms output from the equalizer 122 belong to the eye open state.

The PHY includes a symbol decoder 128, which may be an 8b/10b converter, a 64/66b converter or a 128b/130b converter according to different SerDes environment. The symbol decoder 128 contains a mapping table in use for converting input data bits into codes that are individually represented by fewer bits, for example, projecting each input 10, 66 and 130 data bits into an 8-, 64-, and 128-bit code, respectively. For example, in the 8b/10b SerDes environment, 10 bits can represent $2^{10}=1024$ states while the mapping table includes only $2^8=256$ mappings. If any input data bits cannot be converted into a valid code according to the mapping table, the symbol decoder 128 determines that the input data bits are error and sets a register of an interrupt generator 170 to inform the processing unit 150 that a symbol decoding error has occurred.

When the register value of the interrupt generator 170 is changed, the interrupt generator 170 issues an interrupt (also called INT for brevity) to the processing unit 150 to trigger an interrupt service routine (ISR) being executed by the processing unit 150. In the ISR, the processing unit 150 exams the content of the register and knows the state that is detected by the PHY 110 accordingly, for example, a symbol decoding error has occurred. The processing unit 150 loads and executes relevant firmware code to realize an embodiment of the method for adjusting equalization when detecting a symbol decoding error.

The PHY 110 includes a filler generator 126 for generating continuous fillers, such as K.28.1 symbols, etc. The MAC layer 130 or the processing unit 150 recognizes that the fillers are not data sent by a host side.

The PHY 110 includes a multiplexer (MUX) 129 whose input terminals are coupled to the symbol decoder 128 and the filler generator 126, and whose output terminals are coupled to the MAC layer 130. In regular situations, the MUX 129 connects the output of the symbol decoder 128 to the input of the MAC layer, so that the host data is transferred to the MAC layer 130 through the MUX 129. In addition, the MUX 129 can be controlled by the processing unit 150 to connect the output of the filler generator 126 to the input of the MAC layer 130, so that the fillers generated by the filler generator 126 is transmitted to the MAC layer 130 through the MUX 129. On the other hand, the host data is stopped transmitting to the MAC layer 130.

Figure 5:
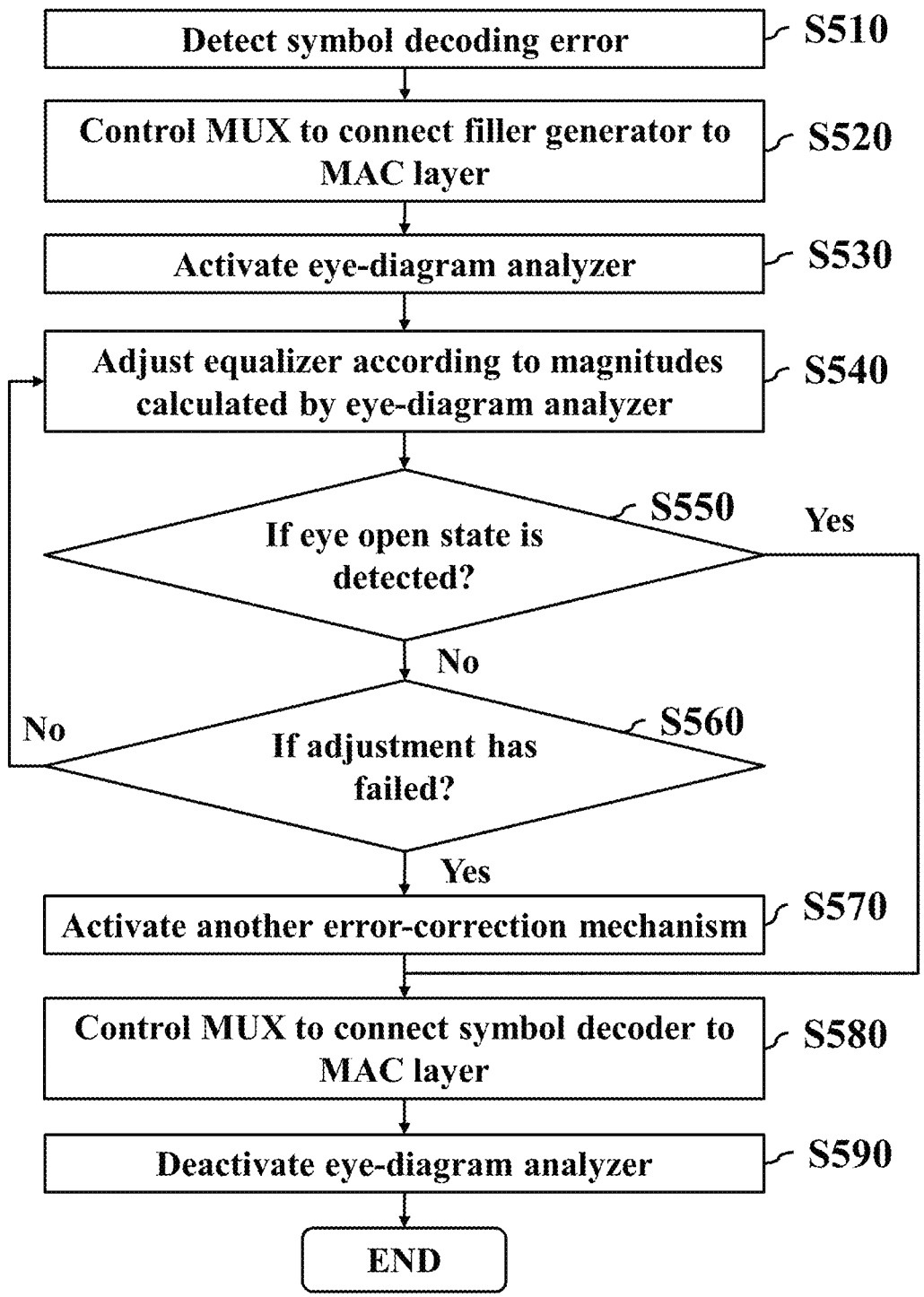
FIG. 5 is a flowchart illustrating a method for adjusting equalization according to embodiments of the invention.

In order for the storage device 120 to actively adjust the equalizer 122 to resolve errors that occur during data reception, the processing unit 150 may load and execute firmware code to complete the method as shown in the flowchart of FIG. 5. The method may be limited to perform when the data transmission between host side and the storage device 10 is run at a high speed, such as High Speed Gear 4 (HS-G4), or higher. Alternatively, the method may be performed regardless of the transmission rate. The characteristics of the method for adjusting equalization as illustrated in the embodiments of the invention include repeatedly adjusting parameters of the equalizer 122 after a symbol decoding error is detected until an adjustment failure is detected or the successive waveforms output from the equalizer 122 belong to the eye open state. Detailed operations are described as follows:

Step S510: it is detected that a symbol decoding error has occurred in the symbol decoder 128 by an interrupt INT. The symbol decoding error may be regarded as a condition for the storage device 10 to trigger an equalization adjustment. Since the interrupt has the highest priority, the processing unit 150 preferentially executes program code to respond to the symbol decoding error.

Step S520: A control signal is issued to the MUX 129 to connect the parallel outputs of the filler generator 126 to the parallel inputs of the MAC layer 130, so that the fillers generated by the filler generator 126 are repeatedly transmitted to the MAC layer 130 through the MUX 129 and erroneous host data is avoided to transmit to the MAC layer 130.

Step S530: A control signal is issued to the eye-diagram analyzer 123 for activating the eye-diagram analyzer 123. The eye-diagram analyzer 123 being activated continuously transmits magnitudes corresponding to an eye diagram to the processing unit 150. Moreover, the eye-diagram analyzer 123 may transmit a relevant message to the processing unit 150 when detecting that the eye diagram belongs to the eye open state.

Step S540: Registers 1225 are set to adjust the parameters of the equalizer 122 by using algorithms known by those skilled in the art according to the magnitudes calculated by the eye-diagram analyzer 123.

Step S550: It is determined whether the eye open state is detected according to the magnitudes and/or message received from the eye-diagram analyzer 123. If so, the process proceeds to step S580. Otherwise, the process proceeds to step S560.

Step S560: It is determined whether the adjustment has failed. If so, the process proceeds to step S570. Otherwise, the process proceeds to step S540. In some embodiments, the processor 150 may start a timer at step S510 for counting a period of time, representing the time allowed for adjustment. The timer is counting to or over this period of time means that the equalization adjustment has reached or exceeded the allowable time and cannot be performed any longer, so that the equalization adjustment fails. In alternative embodiments, the processing unit 150 may determine whether all possible candidate-value combinations of the parameters have been set. If so, the equalizer 122 cannot be adjusted further and the equalization adjustment fails.

Step S570: Another error-correction mechanism is activated. For example, the processing unit 150 may send a message to the host side through the PHY 110 to notify the host side of a symbol decoding error. Thereafter, the host side may slow down the transmission rate between the host side and the storage device 10 and then speed up the transmission rate, activate Feed Forward Equalizer (FFE) of the host-side's transmitter, continuously send training frames (such as PRBS9) to the storage device 10 to assist other equalization adjustment, or use other mechanisms to attempt to resolve the symbol decoding error that occurs in the storage device 10.

Step S580: A control signal is issued to the MUX 129 to connect parallel outputs of the symbol decoder 128 to the parallel inputs of the MAC layer 130 to back to the default connection.

Step S590: A control signal is issued to the eye-diagram analyzer 123 to deactivate the eye-diagram analyzer 123 to save battery power consumption.

Steps S540 to S560 form a loop that may be performed every millisecond or every several milliseconds.

When the eye-diagram analyzer 123 detects that the successive waveforms output from the equalizer 122 belong to the eye open state (the "Yes" path of step S550), it means that the equalizer 122 has been successfully adjusted, and the loop is exited. Subsequently, the processing unit 150 restores the MUX 129 and the eye-diagram analyzer 123 to the default states (steps S580 and S590).

If the output of the equalizer 122 cannot be adjusted to belong to the eye open state after a predetermined period of time has elapsed or all possible candidate-value combinations of the parameters have been tried (the "Yes" path of step S560), it means that the adjustment to the equalizer 122 has failed, and the loop is exited. Next, the processing unit 150 activates another error-correction mechanism (step S570) and restores the MUX 129 and the eye-diagram analyzer 123 to the default states (steps S580 and S590).

Steps S530 and S580 are executed to repeatedly output fillers to the MAC layer 130 for replacing data output from the symbol decoder 128 after a symbol decoding error is detected until an adjustment failure or the successive waveforms output from the equalizer 122 have belonged to the eye open state. In some situations, the MAC layer 130 may directly trigger an error-correction mechanism held by the host side without waiting for results of the equalization adjustment after receiving a symbol decoding error message. The aforementioned steps would prevent the symbol decoding error message from being transmitted to the MAC layer 130, and further prevent triggering of an error-correction mechanism held by the host side.

Figure 6:
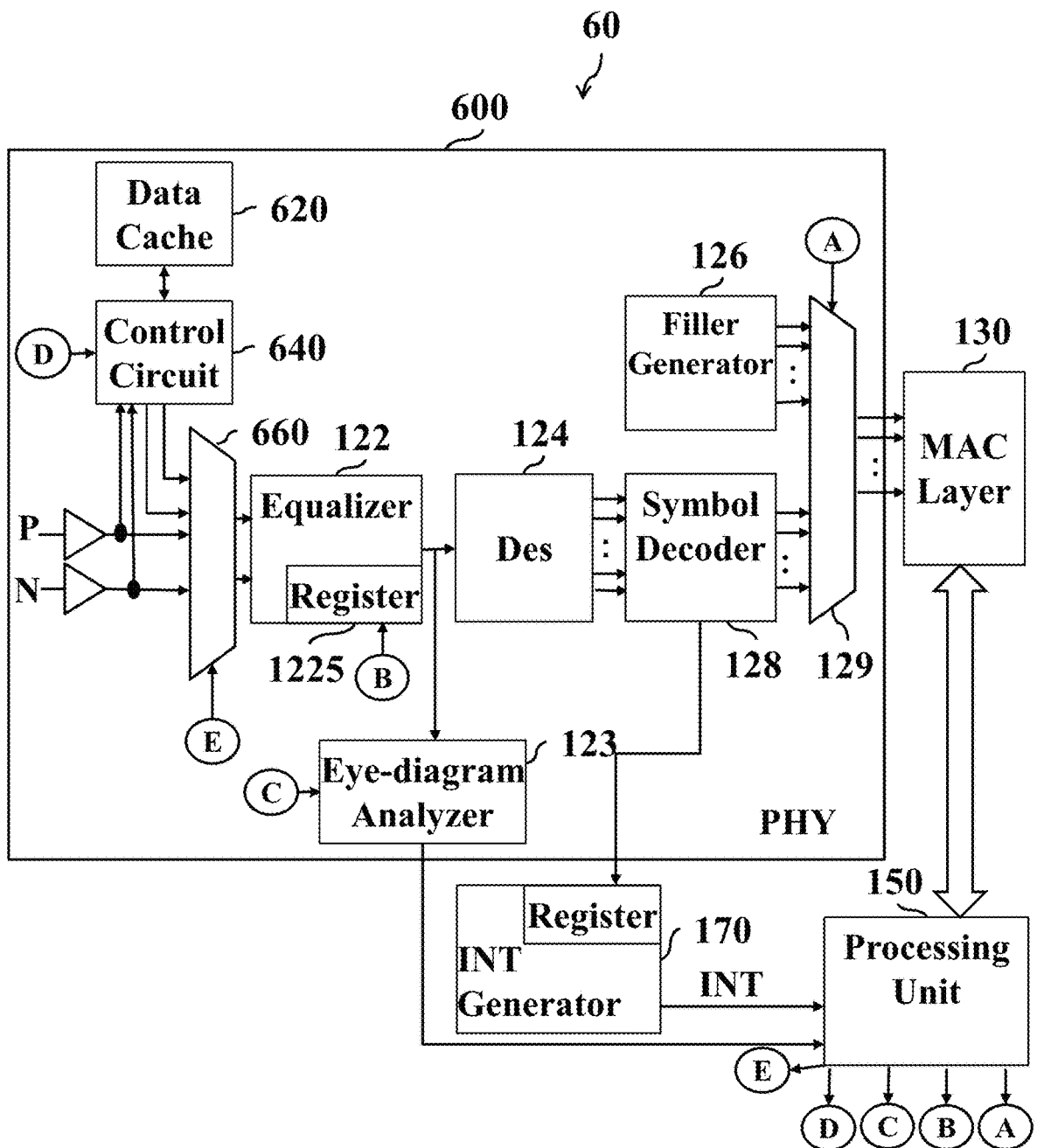
FIG. 6 is a block diagram of a storage device according to an embodiment of the invention.

However, the PHY 110 of FIG. 1 would loss data received from the host side during a time period after a symbol decoding error occurs in the symbol decoder 128 until the equalizer 122 is adjusted successfully. Refer to alternative embodiments of a storage device 60 as shown in FIG. 6. To retain the data received from the host during the time period, a PHY 600 further includes a data cache 620 and a control circuit 640. The processing unit 150 may issue a control signal to drive the control circuit 640 to write data received from the host side into the data cache 620 sequentially. Additionally, in order to let the data in the data buffer 620 to be re-entered into the equalizer 122, the PHY 600 further includes a MUX 660 whose input terminals are coupled to an output of a receiver and an output of the control circuit 640, and whose output terminals are coupled to the input of the equalizer 122. In regular situations within the PHY 600, the receiver is coupled to the equalizer 122 through the MUX 660. The processing unit 150 may issue a control signal to the MUX 660 to connect the output of the control circuit 640 to the equalizer 122, and issue a control signal to drive the control circuit 640 to read data in the data cache 620 and re-feed the read data to the equalizer 122 through the MUX 660 sequentially. The MUX 129 of the PHY 600 may be referred to as a first MUX and the MUX 660 of the PHY 600 may be referred to as a second MUX for distinction.

Figure 7:
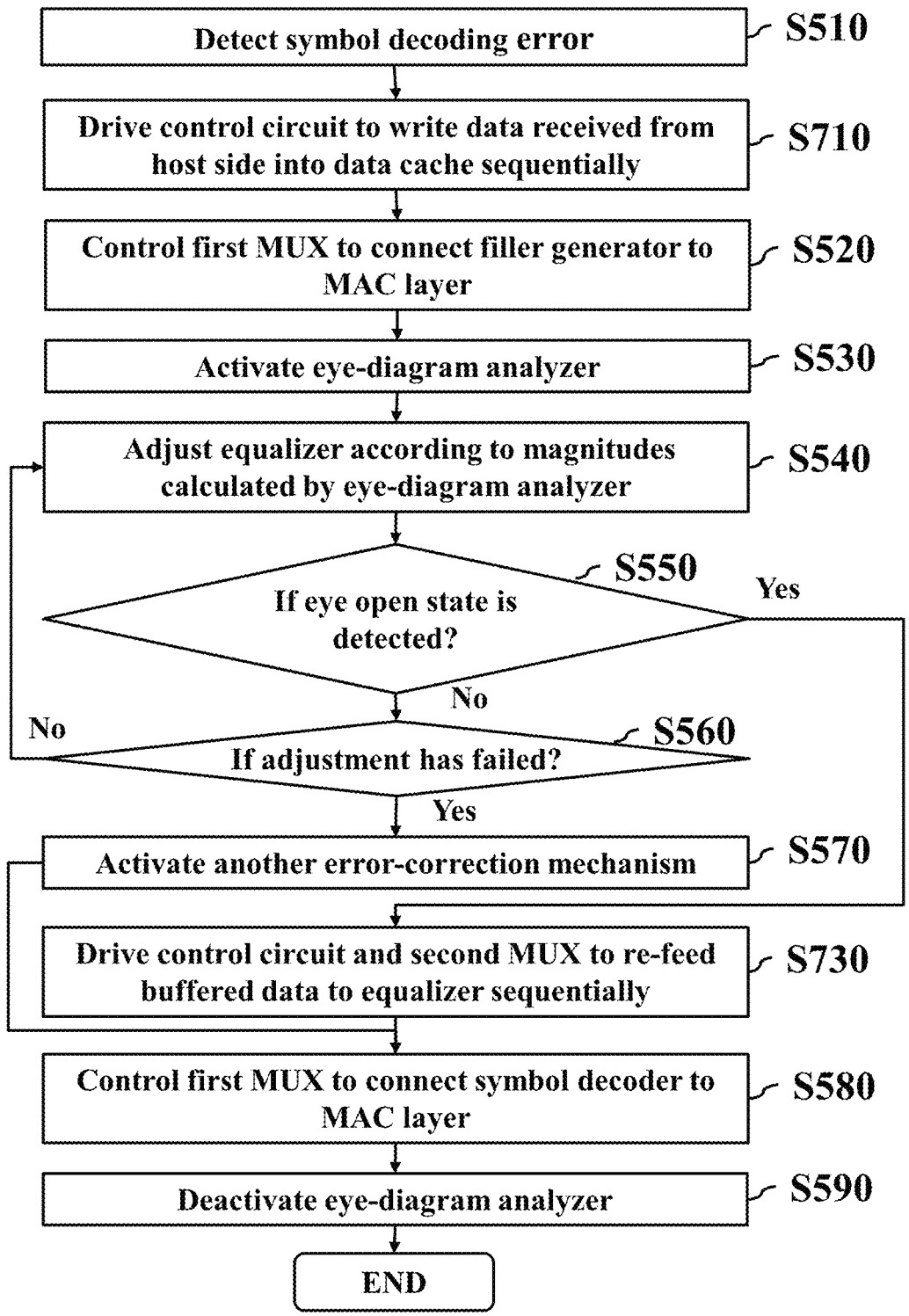
FIG. 7 is a flowchart illustrating a method for adjusting equalization according to embodiments of the invention.

To reflect the architecture as shown in FIG. 6, the processing unit 150 may load and execute another firmware code to complete the method as shown in the flowchart of FIG. 7. In the new process flow, step S710 is added to follow step S510 and step S730 is added to follow the "Yes" path of step S550. Detailed operations are described as follows:

Step S710: The control circuit 640 is driven to write data received from the host side (that is, the received data after a symbol decoding error) into the data cache 620 sequentially.

Step S730: The MUX 660 is controlled to couple the output of the control circuit 640 to the equalizer 122 (in the meantime the equalizer 122 has been adjusted successfully) and a control signal is issued to drive the control circuit 640 to read data in the data cache 620 and re-feed the read data to the equalizer 122 sequentially through the MUX 660. If the time period after a symbol decoding error occurs in the symbol decoder 128 until the equalizer 122 is adjusted successfully is too long to store all data received from the host side in the data cache, the processing unit 150 may abandon re-feeding the data in the data buffer 620 to the adjusted equalizer 122.

Some or all of the aforementioned embodiments of the method of the invention may be implemented in a computer program such as a driver or a firmware program for a dedicated hardware of a storage device, a software application program, or others, or any combinations thereof. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1, 2, and 6, it should be noted that additional elements may be included to achieve better performance without departing from the spirit of the invention. Each element of FIGS. 1, 2, and 6 is composed of various circuits and arranged operably to perform the aforementioned operations. While the process flows described in FIGS. 5 and 7 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-transitory computer program product for adjusting equalization when executed by a processing unit of a storage device, the non-transitory computer program product comprising program code to:

repeatedly adjust a parameter of an equalizer after a symbol decoding error is detected until an adjustment failure is detected or successive waveforms output from the equalizer belong to an eye open state; and repeatedly transmit a filler to a media access control (MAC) layer to replace a decoding result output from a symbol decoder after detecting the symbol decoding failure until the adjustment failure is detected or successive waveforms output from the equalizer belong to the eye open state.

2. The non-transitory computer program product of claim 1, comprising program code to:

recognize the symbol decoding failure by examining the content of a register of an interrupt generator after detecting an interrupt.

3. The non-transitory computer program product of claim 1, comprising program code to:

activate an eye-diagram analyzer to adjust the parameter of the equalizer according to magnitudes corresponding to an eye-diagram, which are generated by the eye-diagram analyzer, after detecting the symbol decoding error until the adjustment failure is detected or successive waveforms output from the equalizer belong to the eye open state.

4. The non-transitory computer program product of claim 3, comprising program code to:

deactivate the eye-diagram analyzer after the adjustment failure is detected or successive waveforms output from the equalizer belong to the eye open state.

5. The non-transitory computer program product of claim 1, comprising program code to:

output the decoding result output from the symbol decoder to the MAC layer to replace the filler after the adjustment failure is detected or successive waveforms output from the equalizer belong to the eye open state.

6. The non-transitory computer program product of claim 1, wherein it is determined that the adjustment has failed when successive waveforms output from the equalizer haven't belonged to the eye open state after a predetermined time period.

7. The non-transitory computer program product of claim 1, wherein it is determined that the adjustment has failed when successive waveforms output from the equalizer haven't belonged to the eye open state after all candidate-value combinations of parameters have been set to the equalizer.

8. The non-transitory computer program product of claim 1, wherein the symbol decoding failure represents that data output from the equalizer cannot be converted into a valid code.

9. A method for adjusting equalization, performed by a processing unit of a storage device when loading and executing program code, comprising:
repeatedly adjusting a parameter of an equalizer after a symbol decoding error is detected until an adjustment failure is detected or successive waveforms output from the equalizer belong to an eye open state;
repeatedly transmitting a filler to a media access control (MAC) layer to replace a decoding result output from a symbol decoder after detecting the symbol decoding failure until the adjustment failure is detected or successive waveforms output from the equalizer belong to the eye open state.

10. The method of claim 9, comprising:
activating an eye-diagram analyzer to adjust the parameter of the equalizer according to magnitudes corresponding to an eye-diagram, which are generated by the eye-diagram analyzer, after detecting the symbol decoding error until the adjustment failure is detected or successive waveforms output from the equalizer belong to the eye open state.

11. The method of claim 10, comprising:
deactivating the eye-diagram analyzer after the adjustment failure is detected or successive waveforms output from the equalizer belong to the eye open state.

12. An apparatus for adjusting equalization, comprising:
an equalizer;
a symbol decoder, coupled to the equalizer, arranged operably to receive host data;
a processing unit, coupled to the equalizer and the symbol decoder, arranged operably to repeatedly adjust a parameter of the equalizer after a symbol decoding error is detected until an adjustment failure is detected or successive waveforms output from the equalizer belong to an eye open state;
a filler generator;
a media access control (MAC) layer, coupled to the processing unit; and
a multiplexer (MUX), comprising an input terminal coupled to the symbol decoder and the filler generator, and an output terminal coupled to the MAC layer,
wherein the processing unit is arranged operably to control the MUX to connect the filler generator to the MAC layer for repeatedly transmitting a filler to the MAC layer to replace a decoding result output from the symbol decoder after detecting the symbol decoding failure until the adjustment failure is detected or successive waveforms output from the equalizer belong to the eye open state.

13. The apparatus of claim 12, comprising:
an interrupt generator coupled to the symbol decoder and the processing unit, comprising a register,
wherein the processing unit is arranged operably to recognize the symbol decoding failure by examining the content of the register of the interrupt generator after detecting an interrupt from the interrupt generator.

14. The apparatus of claim 12, comprising:
an eye-diagram analyzer, coupled to the equalizer and the processing unit,
wherein the processing unit is arranged operably to activate the eye-diagram analyzer to adjust the parameter of the equalizer according to magnitudes corresponding to an eye-diagram, which are generated by the eye-diagram analyzer, after detecting the symbol decoding error until the adjustment failure is detected or successive waveforms output from the equalizer belong to the eye open state.

15. The apparatus of claim 14, wherein the processing unit is arranged operably to deactivate the eye-diagram analyzer after the adjustment failure is detected or successive waveforms output from the equalizer belong to the eye open state.

16. The apparatus of claim 12, wherein the processing unit is arranged operably to control the MUX to connect the symbol decoder to the MAC layer for outputting the decoding result output from the symbol decoder to the MAC layer to replace the filler after the adjustment failure is detected or successive waveforms output from the equalizer belong to the eye open state.

17. The apparatus of claim 12, wherein the processing unit is arranged operably to determine that the adjustment has failed when successive waveforms output from the equalizer haven't belonged to the eye open state after a predetermined time period, or all candidate-value combinations of parameters have been set to the equalizer.

18. The apparatus of claim 12, comprising:
a data cache;
a control circuit, coupled to the data cache; and
a multiplexer (MUX), comprising an input terminal coupled to the control circuit and a receiver, and an output terminal coupled to the equalizer,
wherein the processing unit is arranged operably to control the MUX to connect the control circuit to the equalizer and drive the control circuit to re-feed buffered host data to the equalizer, which is received after the symbol decoding failure, after successive waveforms output from the equalizer belong to the eye open state.

* * * * *